Nov. 26, 1929.  K. W. WEISS  1,737,531
NONSKID ARMOR FOR TIRES
Filed March 10, 1927    2 Sheets-Sheet 1
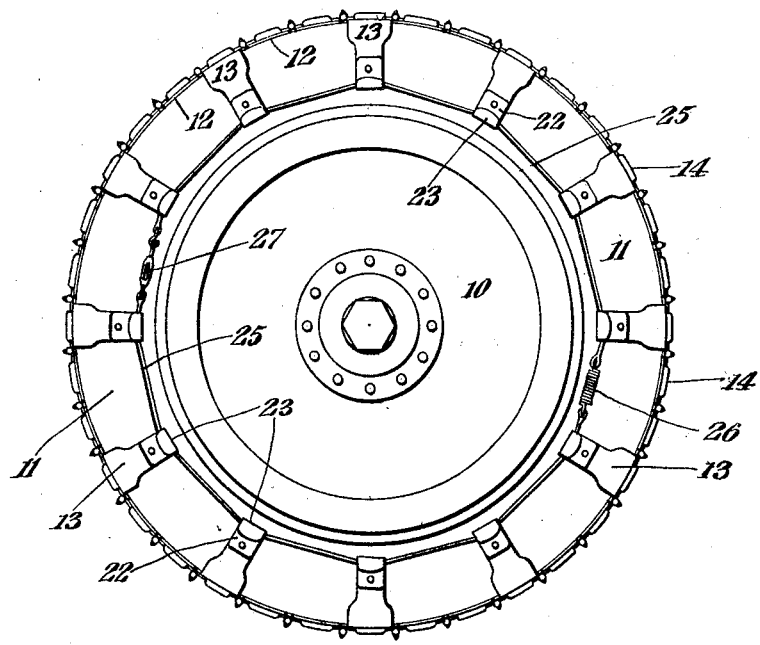
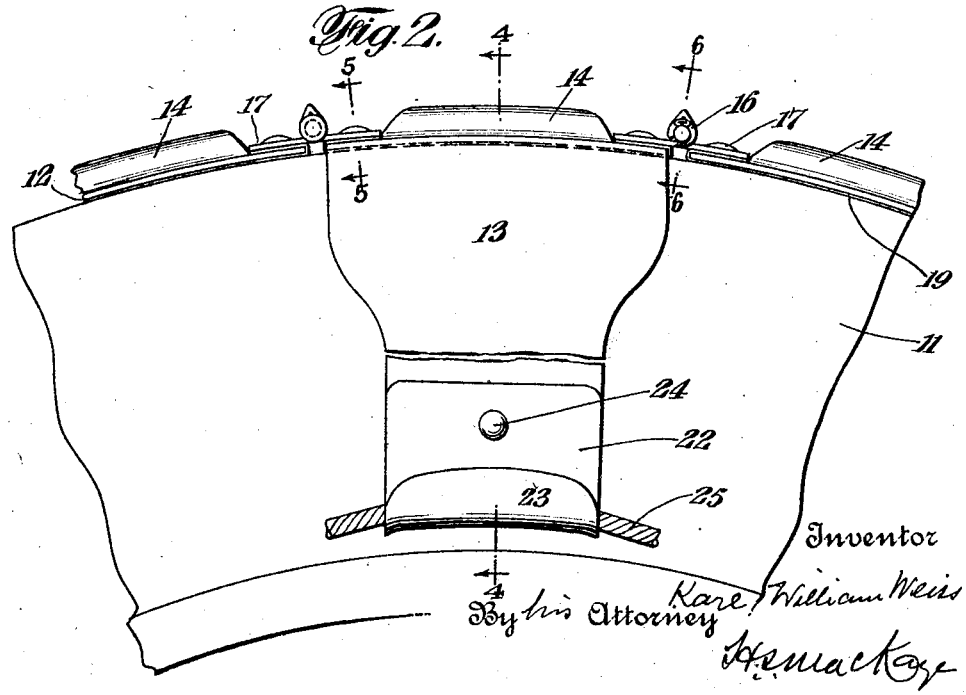

Nov. 26, 1929.　　　　　K. W. WEISS　　　　　1,737,531
NONSKID ARMOR FOR TIRES
Filed March 10, 1927　　　2 Sheets-Sheet 2
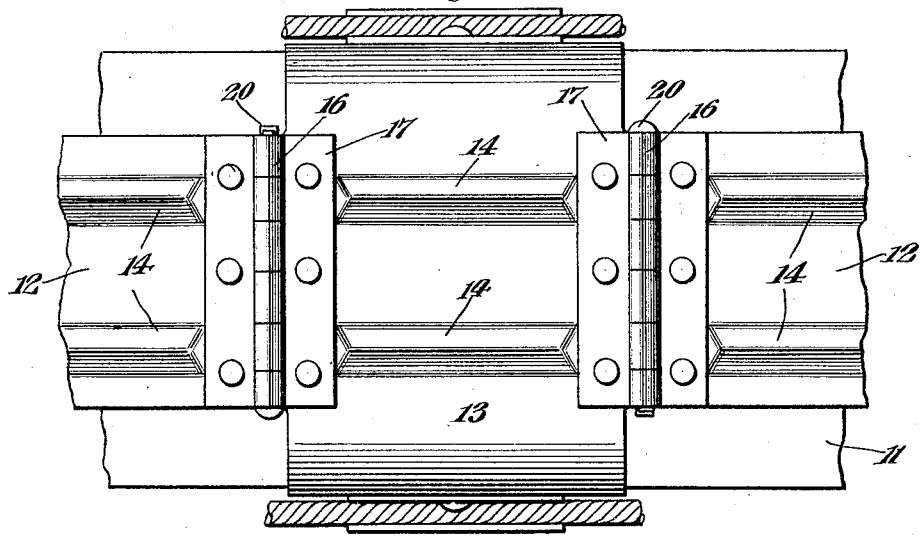
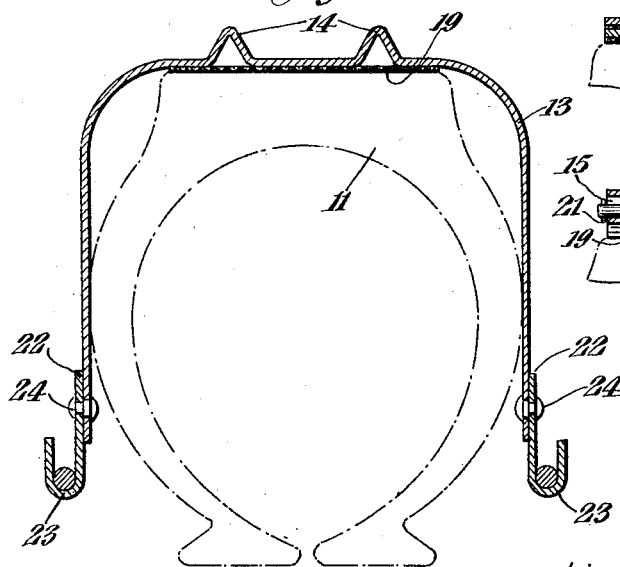
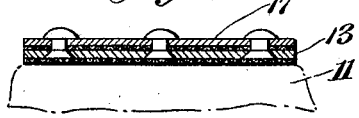
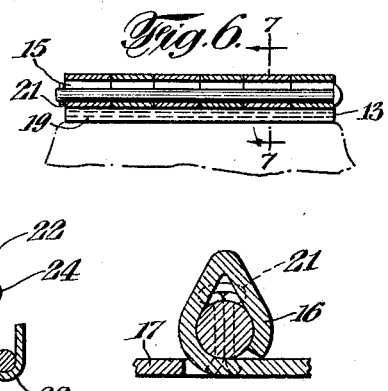
Karl William Weiss
Inventor
By his Attorney Patented Nov. 26, 1929

1,737,531

UNITED STATES PATENT OFFICE

KARL WILLIAM WEISS, OF YONKERS, NEW YORK

NONSKID ARMOR FOR TIRES

Application filed March 10, 1927. Serial No. 174,385.

The present invention relates to a simple, reliable and durable armor which can be easily put on and taken off of an automobile tire, and which will effectually prevent skidding, while adding greatly to the tractive power of the driving wheels.

My improved non-skid apparatus will not cut the tire, and, being of a nature to creep it will exert an even wear over the tire surface. Moreover, being made in separable sections the length of a given armor group can be easily varied by substitution of one or more adjusting plates.

My non-skidding armor is relatively light, and is adapted to be fastened upon a tire shoe by means making it very easy to apply or remove the same. Another advantage of my armor is that, single component plates can be replaced easily and quickly without removing the armor from the wheel.

The invention is illustrated in a preferred form in the accompanying drawings, wherein Figure 1 is a side elevation of a wheel equipped with my armor, Figure 2 is a similar view on a larger scale of short section of the armor in place, showing one fastening saddle, Figure 3 is a plan view of what is shown in elevation in Figure 2, Figure 4 is a transverse sectional view on the line 4—4 in Figure 2, Figure 5 is a similar view on the line 5—5 in Figure 2, Figure 6 is a similar view on the line 6—6 in Figure 2, Figure 7 is a sectional view on a larger scale taken on the line 7—7 in Figure 6, and Figure 8 shows a modification in side elevation.

A wheel is shown at 10 equipped with the usual tire 11 which may be a balloon tire or any other kind of tire. The armor comprises, generally speaking, a series of jointed plates 12 combined with fastening saddles 13 at intervals, which latter are made to fit over and straddle the tire as shown in Figure 4. The particular number of plates and saddles is not essential, and, while the drawings show two armor plates between each pair of saddles, it is within the scope of the invention to use any convenient number.

My improved armor is provided with two sets of ribs. One set of ribs extends across from side to side and is designed to give increased tractive effort by preventing idle rotation of the wheel in slippery places. The other set of ribs extends longitudinally and prevents sideways slipping or skidding. The preferred disposition of these ribs is as follows.

The non-skid ribs 14 are placed longitudinally on the plates 12 and on the saddles 13, as shown particularly in Figures 3 and 4. They are preferably formed so as to present a more or less sharp ridge or apex as shown in those figures.

The armor plates between the saddles, when more than one are used between each pair of saddles, are joined by hinges 15, and they are joined to each side of each saddle by somewhat similar hinges 16. Some or all of these hinges are made with a more or less sharp top ridge as clearly shown in Figure 7, and these serve as the set of traction-increasing ridges above mentioned. The hinging of the intermediate plates 12 to the saddles 13 is preferably accomplished by means of hinge plates 17 riveted to the plates 12 and 13 as shown in Figure 5.

In one modification of my invention, shown in Figure 8, these plates 17' are made broad and are furnished with non-skid ridges 18, which thus take the place of the ridges 14. All of the plates are preferably lined with felt or canvas 19.

The hinges 16, joining the saddles with the intermediate plates are made with removable spindles 20, headed at one end and secured in place by a wire or cotter pin such as indicated at 21 in Figure 7. It will be seen that, by drawing out the spindles 20, the plates 12 can be disconnected from the saddles 13, for replacement or repair, without taking the armor off of the wheel. By having extra plates 12 of different sizes, the total length of a suit of armor may be altered to suit different tires etc.

The fastening of the armor on the tire is accomplished by means of the removable saddles 13, and any suitable contrivance for this purpose is within the scope of the invention. The preferred means for this end are adapted to making it very easy to adjust or remove the armor with a minimum of time and effort. Its construction is shown in the drawings.

Each side of each saddle ends at the bottom in a hook, and this preferably takes the form of a separate plate 22, curved upward and outward at the bottom to form a channel 23. This plate is preferably fastened to the side of the saddle in a manner to permit swinging in a plane parallel to the plane of the wheel, as by the somewhat loose rivet 24.

On each side of the wheel the saddles are all drawn toward the center and held in place by a suitable cable, preferably a wire rope 25 which lies in the channels 23 of the swinging plates 22. The plates 22, being free to swing, accommodate themselves to the inequalities of intensity and direction of stresses due to compression of the tire while running, creeping and other causes.

The cable or rope 25 is made in two parts united at one point by a spring 26, and at a second point by a turn-buckle 27. These fastenings make it a very simple matter not only to adjust the cable or rope to the saddles 13 and to remove it therefrom, but also to regulate the tension of the cable to suit all circumstances.

Many changes may be made in this device without departing from the scope of my invention which is not limited to the details herein shown and described.

What I claim is—

Non-skid armor for tires comprising a plurality of saddle members curved to conform to the transverse curvature of a tire and having their extremities forming arms disposed adjacent the felly of the wheel upon which the tire is mounted, narrow plate members connecting said saddle members at their central portions, said connecting plates being disposed along the center of the tread of the tire and terminating within limits defined by the sides of said tread, means pivoted to the extremities of the saddles to swing in a plane parallel to the plane of the wheel, but prevented from swinging in any other plane whereby the twisting of the saddles will be prevented, and means engaging said last mentioned means for holding the armor on the tire.

In testimony whereof I have hereto affixed my signature on this 7th day of March, 1927.

KARL WILLIAM WEISS.